(12) United States Patent
Kokawa

(10) Patent No.: US 9,599,501 B2
(45) Date of Patent: Mar. 21, 2017

(54) DEVICES AND SYSTEMS FOR LIQUID LEVEL DETECTION IN HEMATOLOGY INSTRUMENTS, AND METHODS RELATED THERETO

(71) Applicant: Abbott Laboratories, Abbott Park, CA (US)

(72) Inventor: Hidesuke Kokawa, Sunnyvale, CA (US)

(73) Assignee: Abbott Laboratories, Abbott Park, IL (US)

( * ) Notice: Subject to any disclaimer, the term of this patent is extended or adjusted under 35 U.S.C. 154(b) by 739 days.

(21) Appl. No.: 13/720,603

(22) Filed: Dec. 19, 2012

(65) Prior Publication Data
US 2013/0167613 A1 Jul. 4, 2013

Related U.S. Application Data

(60) Provisional application No. 61/581,457, filed on Dec. 29, 2011.

(51) Int. Cl.
| | | |
|---|---|---|
| G01F 19/00 | (2006.01) | |
| G01F 25/00 | (2006.01) | |
| G01F 23/26 | (2006.01) | |

(52) U.S. Cl.
CPC ........ G01F 25/0061 (2013.01); G01F 23/263 (2013.01); G01F 23/266 (2013.01); G01F 23/268 (2013.01)

(58) Field of Classification Search
CPC .. G01F 23/263; G01F 25/0061; G01F 23/268; G01F 23/266

USPC .............................................. 73/304 C, 1.73
See application file for complete search history.

(56) References Cited

U.S. PATENT DOCUMENTS

| | | | |
|---|---|---|---|
| 4,099,118 A | | 7/1978 | Franklin et al. |
| 4,818,492 A | | 4/1989 | Shimizu |
| 5,262,731 A | * | 11/1993 | Mizoguchi ..................... 324/663 |
| 5,493,922 A | * | 2/1996 | Ramey et al. ............. 73/863.02 |
| 5,627,522 A | * | 5/1997 | Walker et al. ................ 340/618 |
| 5,855,851 A | | 1/1999 | Matsubara et al. |
| 2003/0000303 A1 | * | 1/2003 | Livingston ............ G01F 23/268 73/304 C |
| 2011/0232769 A1 | * | 9/2011 | Nichogi et al. ................... 137/3 |

\* cited by examiner

*Primary Examiner* — John Fitzgerald
*Assistant Examiner* — Truong Phan
(74) *Attorney, Agent, or Firm* — Edward J. Baba; Brian E. Davy; Bozicevic, Field & Francis LLP

(57) ABSTRACT

A hematology instrument with liquid level detection for liquid in a container is provided. The hematology instrument includes a probe disposed next to a container site. The probe is displaceable relative to the container site to enter a container when positioned at the container site. Further, the probe is electrically grounded. The hematology instrument includes a capacitive sensor having at least one capacitive electrode disposed next to the container site. The capacitive sensor also has a detection module to detect capacitive changes at the at least one capacitive electrode when the probe contacts liquid in the container. The hematology instrument also includes a calibration module configured to calibrate the capacitive sensor a plurality of times as the probe displaces relative to the container site to enter the container. Kits and methods related thereto are also provided.

24 Claims, 6 Drawing Sheets

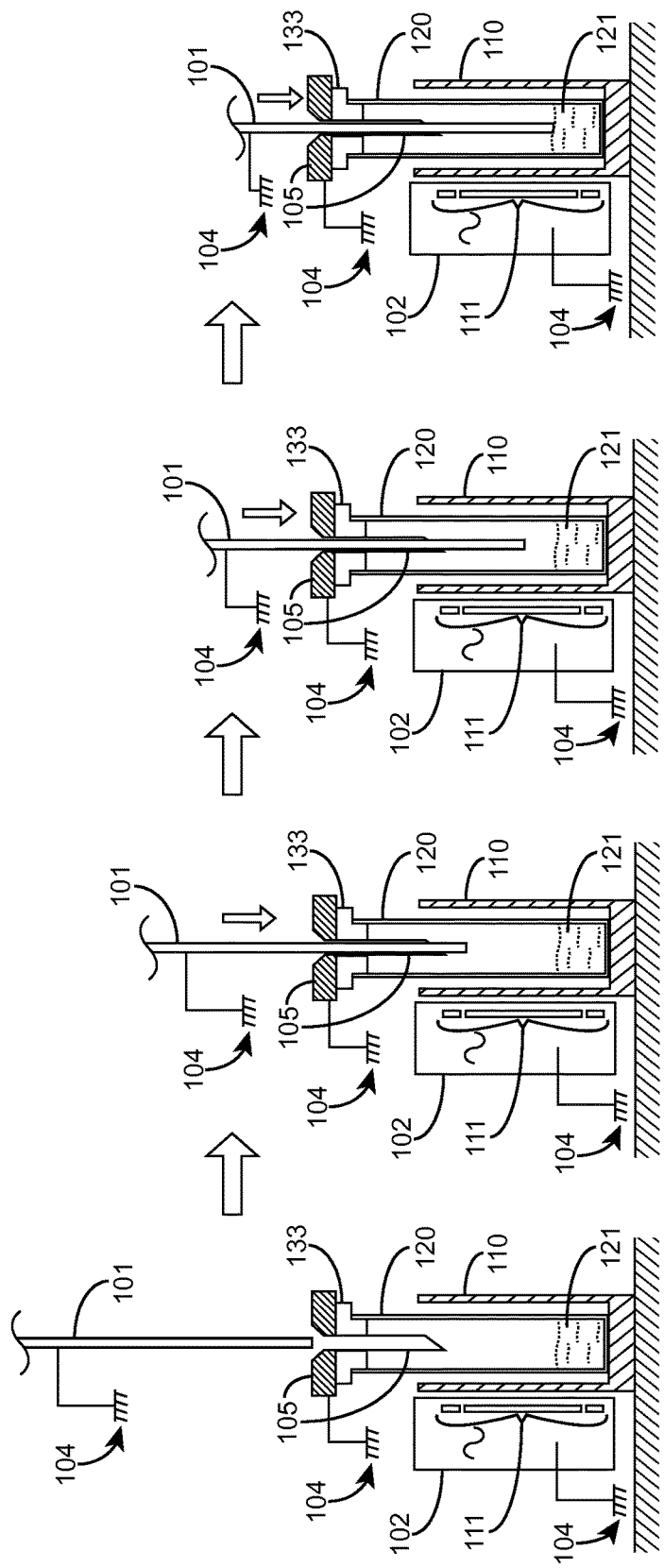

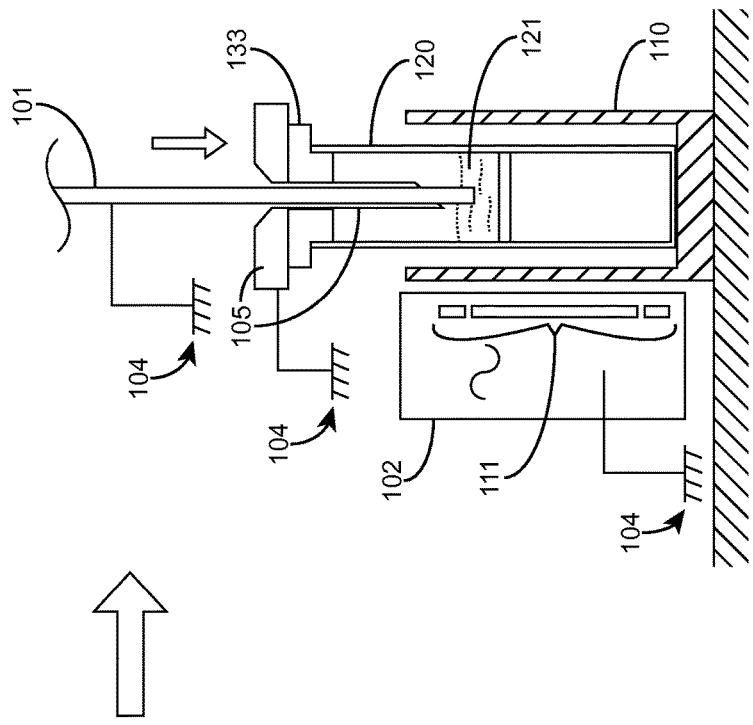
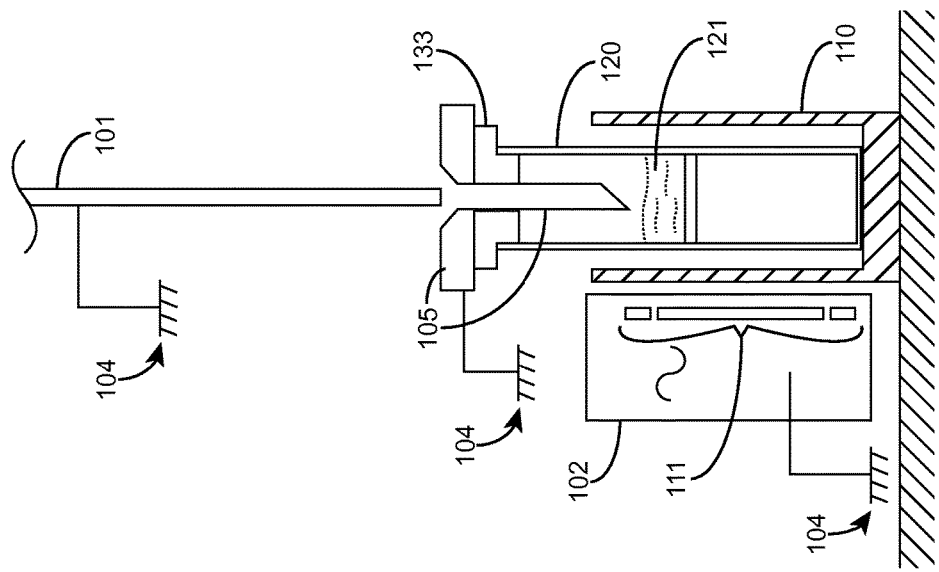
FIG. 7A
FIG. 7B

DEVICES AND SYSTEMS FOR LIQUID LEVEL DETECTION IN HEMATOLOGY INSTRUMENTS, AND METHODS RELATED THERETO

CROSS REFERENCE TO RELATED APPLICATIONS

Under 35 U.S.C. §119(e), this application claims priority to the filing date of U.S. Provisional Patent Application Ser. No. 61/581,457, filed on Dec. 29, 2011, the disclosure of which application is herein incorporated by reference in its entirety.

BACKGROUND

The present disclosure relates generally to hematology instruments and detecting liquid levels within containers. For example, containers such as sample tubes or test tubes are often used to contain liquid specimens such as blood plasma. An automatic analyzer may include a probe for taking up a liquid specimen, for example, and further may include a vertically movable mechanism to lower the probe towards a container. In some instances, the probe may have a nozzle formed therein or otherwise coupled to a nozzle. Detecting when the probe contacts the liquid may be desirable. For example, the probe should lower sufficiently to contact the liquid, in which case detecting when such contact occurs is useful. Furthermore, in some cases, immersion too deep within the liquid may be undesirable—e.g., may cause an adverse effect on the result of analysis of the liquid specimen. In such case, detection of the surface level of the liquid is useful. Still further, detection may be important for other purposes—e.g., identifying a liquid level to identify a volume of liquid within the container, etc.

SUMMARY

In some aspects of the present disclosure, a hematology instrument with liquid level detection for liquid in a container is provided. The hematology instrument includes a probe disposed next to a container site. The probe is displaceable relative to the container site to enter a container when positioned at the container site. Further, the probe is electrically grounded. The hematology instrument includes a capacitive sensor having at least one capacitive electrode disposed next to the container site.

In some aspects of the present disclosure, a method of detecting a liquid level in a container for a hematology instrument is provided. The method includes providing a liquid level detection unit having a capacitive sensor with at least one capacitive electrode and a detection module to detect capacitive changes at the at least one capacitive electrode; and a probe disposed next to the container site, e.g., proximate to the container site or adjacent to the container site. The probe is electrically grounded and is displaceable relative to the container site to enter a container when positioned at the container site. The method also includes positioning the at least one capacitive electrode next to the container site, configuring a calibration module to calibrate the capacitive sensor a plurality of times as the probe displaces relative to the container site, and configuring the detection module to detect a capacitive change at the at least one capacitive electrode when the probe contacts liquid in the container.

In some aspects of the present disclosure, a method of detecting a liquid level in a container for a hematology instrument is provided. The method includes positioning at least one capacitive electrode of a capacitive sensor next to a container including liquid, and positioning a probe adjacent to an entry point of the container. The probe is electrically grounded. The method also includes displacing the probe relative to the container to enter the container and contact the liquid, calibrating the capacitive sensor a plurality of times as the probe is displaced relative to the container, and detecting a capacitive change at the capacitive electrodes when the probe contacts the liquid.

BRIEF DESCRIPTION OF THE DRAWINGS

A detailed description of various embodiments of the present disclosure is provided herein with reference to the accompanying drawings, which are briefly described below. The drawings are illustrative and are not necessarily drawn to scale. The drawings illustrate various embodiments of the present disclosure and may illustrate one or more embodiment(s) or example(s) of the present disclosure in whole or in part. A reference numeral, letter, and/or symbol that is used in one drawing to refer to a particular element may be used in another drawing to refer to a like element.

FIGS. 6A-6D illustrates a hematology instrument with liquid level detection at different times during liquid level detection, according to one embodiment.

FIGS. 7A-7B illustrates a hematology instrument with liquid level detection at different times during liquid level detection, according to one embodiment.

DETAILED DESCRIPTION

Figure 1:
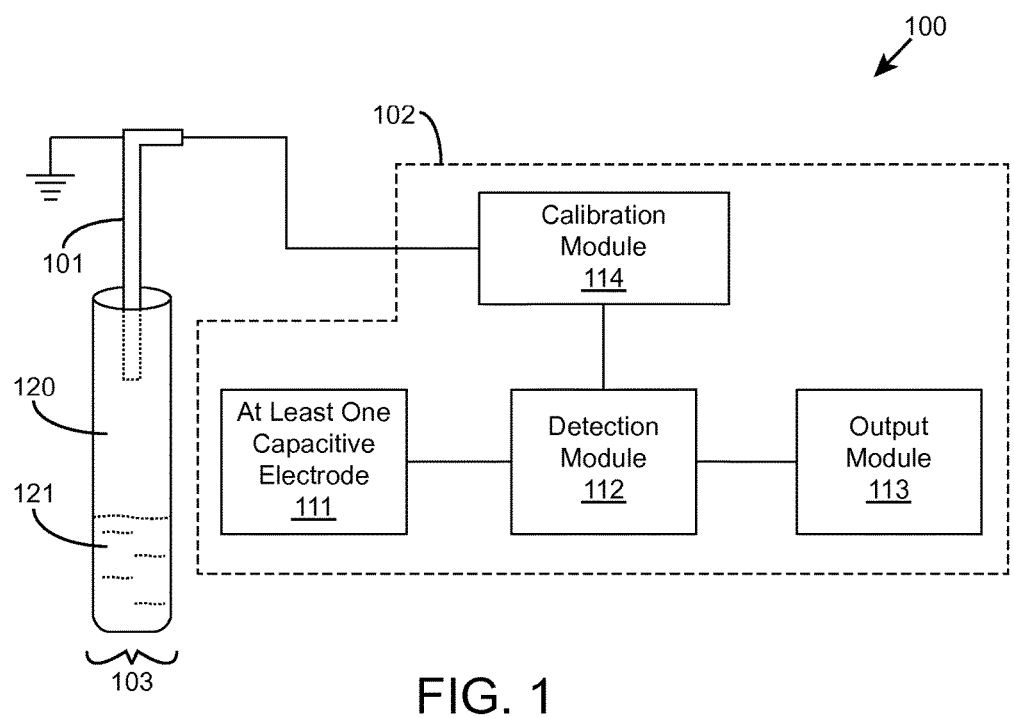
FIG. 1 illustrates a block diagram of a hematology instrument with liquid level detection for liquid in a container, according to one embodiment.

Before the embodiments of the present disclosure are described, it is to be understood that the present disclosure is not limited to particular embodiments described, as such may, of course, vary. It is also to be understood that the terminology used herein is for the purpose of describing particular embodiments only, and is not intended to be limiting, since the scope of the embodiments of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the present disclosure. The upper and lower limits of these smaller ranges may independently be included or excluded in the range, and each range where either, neither or both limits are included in the smaller ranges is also encompassed within the present disclosure, subject to any specifically excluded limit in the stated range. Where the stated range includes one or both of the limits, ranges excluding either or both of those included limits are also included in the present disclosure.

In the description of the present disclosure herein, it will be understood that a word appearing in the singular encompasses its plural counterpart, and a word appearing in the plural encompasses its singular counterpart, unless implicitly or explicitly understood or stated otherwise. Further, it will be understood that for any given component described herein, any of the possible candidates or alternatives listed for that component, may generally be used individually or in combination with one another, unless implicitly or explicitly understood or stated otherwise. Additionally, it will be understood that any list of such candidates or alternatives, is merely illustrative, not limiting, unless implicitly or explicitly understood or stated otherwise.

Various terms are described below to facilitate an understanding of the present disclosure. It will be understood that a corresponding description of these various terms applies to corresponding linguistic or grammatical variations or forms of these various terms. It will also be understood that the present disclosure is not limited to the terminology used herein, or the descriptions thereof, for the description of particular embodiments. The publications discussed herein are provided solely for their disclosure prior to the filing date of the application. Nothing herein is to be construed as an admission that the embodiments of the present disclosure are not entitled to antedate such publication by virtue of prior invention. Further, the dates of publication provided may be different from the actual publication dates which may need to be independently confirmed.

The present disclosure relates generally to hematology instruments and detecting liquid levels within containers. For example, containers such as sample tubes or test tubes are often used to contain liquid specimens such as blood plasma. An automatic analyzer may include a probe for taking up a liquid specimen, for example, and further may include a vertically movable mechanism to lower the probe towards a container. In some instances, the probe may have a nozzle formed therein or otherwise couple to a nozzle. Detecting when the probe contacts the liquid may be desirable. For example, the probe should lower sufficiently to contact the liquid, in which case detecting when such contacts occurs is useful. Furthermore, in some cases, immersion too deep within the liquid may be undesirable— e.g., may cause an adverse effect on the result of analysis of the liquid specimen. In such case, detection of the surface level of the liquid is useful. Still further, detection may be important for other purposes—e.g., identifying a liquid level to identify a volume of liquid within the container, etc.

As summarized above, in some aspects of the present disclosure, a hematology instrument with liquid level detection for liquid in a container is provided. The hematology instrument includes a probe disposed next to a container site. The probe is displaceable relative to the container site to enter a container when positioned at the container site. Further, the probe is electrically grounded. The hematology instrument includes a capacitive sensor having at least one capacitive electrode disposed next to the container site. The capacitive sensor also has a detection module to detect capacitive changes at the at least one capacitive electrode when the probe contacts liquid in the container. The hematology instrument also includes a calibration module configured to calibrate the capacitive sensor a plurality of times as the probe displaces relative to the container site to enter the container.

FIG. 1 illustrates a block diagram of a hematology instrument with liquid level detection for liquid in a container, according to one embodiment. Hematology instrument 100 includes a grounded probe 101 and capacitive sensor 102 that are disposed next to a container site 103 such that the capacitive sensor 102 and grounded probe 101 are next to a container 120 when placed at the container site 103. The container 120 includes liquid 121 therein. The probe 101 contacts the liquid 121 when inserted within the container 120, which is detected by the capacitive sensor 102.

The probe 101 may be made from any variety of conductive materials that enable it to be electrically grounded to a common electric potential of the instrument 100. For example, the probe 101 may be made of one or more metals, metal alloys, or a combination thereof. The probe 101 may also include non-conductive materials, such as resins or polymeric materials (e.g., plastics, rubber, etc.) in combination with conductive materials to provide a probe that is conductive. In some instances, the probe 101 may include a nozzle formed or coupled to the end of the probe. The nozzle may be used, for example, to facilitate with liquid to be drawn within the probe.

The probe 101 is relatively displaceable with respect to the container 120 or container site 103. It should be appreciated that the relative displacement of the probe 101 with respect to the container 120 and container site 103 may encompass embodiments where the probe 101 is moved towards the container 120 as well as embodiments where the container 120 is moved towards the probe 101. For example, in one embodiment, the probe 101 may be aligned vertically over an upright container 120, such as a sample tube or test tube, for example, and lowered into an open end of a sample tube. For instance, the probe 101 may be coupled to a probe arm 106 that is raised and lowered by an arm lifter 107 powered by a motor 108. The motor 108 may be connected, for example, to a controller or processing device (not shown) that controls the movement of the probe 101. In other embodiments, the probe 101 may remain fixed while the container site 103 and container 120 move towards the probe 101 such that the probe 101 enters the container 120 and eventually contacts liquid 121 within the container 120.

As stated above, the hematology instrument 100 includes a capacitive sensor 102 having at least one capacitive electrode 111 disposed next to the container site 103. The one or more capacitive electrodes 111 are disposed such that it is next to the container 120 when at the container site 103. The distances between the capacitive electrode 111 and the container 120 may be, for example, less than 5 inches, such as 3 inches or less, and including 1 inch or less.

In one embodiment, the plurality of capacitive electrodes 111 is disposed next to the container site 103 with the capacitive electrodes 111 disposed next to each other. The distance between the electrodes may vary, and example distances between electrodes may range from within 2 inches of each other, such as within 1 inch of each other, including within a quarter inch of each other. It should be appreciated that other distances may also be implemented in other embodiments. In one embodiment, the capacitive electrodes 111 are disposed one after another in the direction of the displacement of the probe 101—e.g., stacked vertically above one another.

In one embodiment, the plurality of capacitive electrodes 111 includes a pair of coupled capacitive electrodes and a central capacitive electrode disposed between the pair of coupled capacitive electrodes. In some instances, each of the pair of coupled capacitive electrodes is smaller in physical size than the central capacitive electrode. For example, in one embodiment, the pair of capacitive electrodes are thin strips (e.g., 1 inch wide by 0.1 inch in height) positioned above and below a larger central capacitive electrode (e.g., 1 inch by 1 inch). It should be appreciated that these measurements are exemplary and that other variations of dimensions may be implemented in other embodiments.

In one embodiment, the plurality of capacitive electrodes 111 includes a first plurality of coupled capacitive electrodes and a second plurality of coupled capacitive electrodes alternately disposed between the first plurality of coupled capacitive electrodes. For example, a first capacitive electrode in the first plurality is positioned at the top, followed by a first capacitive electrode of the second plurality underneath it, followed by a second capacitive electrode in the first plurality positioned underneath the first capacitive electrode of the second plurality, followed by a second capacitive electrode in the second plurality positioned underneath the second capacitive electrode of the first plurality, and so on and so forth for all capacitive electrodes in the first and second plurality.

In one embodiment, each of the capacitive electrodes of the first plurality is smaller in size than each of the capacitive electrodes of the second plurality, similarly as described above. The number of capacitive electrodes in each plurality may vary. In some instances, each plurality has the same number of electrodes, and in other embodiment, the number of electrodes are different. Example number of electrodes within one of the pluralities may range from two to thirty, such as five to fifteen electrodes, including seven to twelve electrodes. In one embodiment, each plurality includes ten capacitive electrodes.

The capacitive sensor 102 also has a detection module 112 to detect capacitive changes at the at least one capacitive electrode 111 when the probe 101 contacts liquid 121 in the container 120. In one embodiment, the detection module 112 includes a detection circuit having two one-shot multivibrators coupled to the capacitive electrodes 111. The outputs of the multivibrators may be coupled to electronic circuitry providing an output signal that may be monitored or measured—e.g., by a meter or measuring device. The instrument 100 may include an output module 113, for example, that indicates when the liquid level is detected and/or provides data representing the liquid level detection. For example, in some instances, the output module 113 may include a visual or audio device that indicates when the liquid is contacted. The visual or audio device may be any variety of devices, such as an LED, speaker, etc. In some instances, the output module 113 may include a transmitting device to transmit a signal representing the liquid level detection. In some instances, the output module may include memory and/or a processing device that stores or otherwise processes the signal indicating a liquid level detection.

The hematology instrument 100 includes a calibration module 114 configured to calibrate the capacitive sensor 102 a plurality of times as the probe 101 displaces relative to the container site 103 to enter the container 120. Calibration module 114 may include calibration circuitry that calibrates the capacitive sensor 102 by setting a DC offset level of the output signal of the detection module 112. It should be appreciated that the calibration module 114 may also include, or communicate with, a processing device that is programmed to calibrate the detection module—e.g., by setting or otherwise adjusting a DC offset of the output signal. For instance, a computer may be coupled to the instrument 100 to provide instructions to the calibration module 114 as to when to calibrate the capacitive sensor 102. The computer may receive input data, such as data regarding the movement of the probe 101, which may be used to determine when the capacitive sensor 102 should be calibrated.

The calibration module 114 is configured to calibrate the capacitive sensor 102 a plurality of times as the probe 101 displaces relative to the container site 103 to enter the container 120. For example, the calibration module 114 may be configured to calibrate the capacitive sensor 102 a plurality of times after the probe 101 is displaced relative to the container site 103. Calibration may also occur before the probe 101 is displaced relative to the container site 103 in some instances. In some instances, the calibration module 114 is configured to calibrate the capacitive sensor 102 after the probe 101 displaces a predetermined distance relative to the container site 103. In some instances, the calibration module 114 is configured to calibrate the capacitive sensor 102 after predetermined incremental distances relative to the container site 103.

The calibration module 114 may be configured to calibrate the calibration sensor at times with respect to its position relative to the container 120. For example, the calibration module 114 may be configured to calibrate the capacitive sensor 102 a plurality of times when the probe 101 is moved into the container 120. For instance, calibration may occur before the probe 101 enters the container 120; when the probe 101 enters the container 120; or after the probe 101 enters the container 120 disposed at the container site 103. In some instances, the calibration module 114 is configured to calibrate the capacitive sensor 102 after the probe 101 displaces a predetermined distance within the container 120 disposed at the container site 103. In some instances, the calibration module 114 is configured to calibrate the capacitive sensor 102 after predetermined incremental distances within the container 120 disposed at the container site 103. It should be appreciated that in various embodiments, the calibration module 114 may be configured to calibrate the capacitive sensor 102 in a variety of combinations of any of the times mentioned above.

In some embodiments, the container 120 includes a cap disposed therein, such as to cap the open end of the container 120 (e.g., sample tube or test tube). The cap may be made from any variety of materials, such as polymeric materials (e.g., plastics, rubber, etc.), etc., that may be used to plug the open end of the container 120. The cap should include access for the probe 101 to enter the container 120—e.g., via a hole disposed within the cap that enables a cap piercing needle to fit through to form a channel in which the probe 101 may travel to enter the container 120. The cap piercing needle may be made partially or completely from conductive material and may be grounded to a common electric potential. It should be appreciated that in some embodiments, the cap and cap piercing needle may be a formed as a single element.

It should be appreciated that the container 120 may be made from a variety of materials but should enable the capacitive electrodes to detect capacitive changes within the container 120. For example, the container 120 may be a glass or plastics sample tube or test tube. It should be appreciated that the shape of the container 120 may vary for the purpose of analysis intended.

Figure 2:
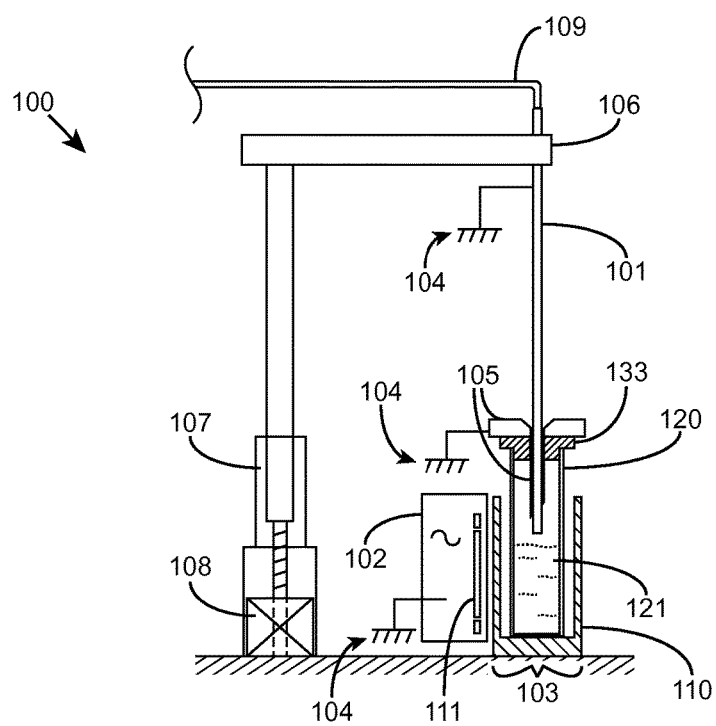
FIG. 2 illustrates a diagram of a hematology instrument with liquid level detection for liquid in a container, according to one embodiment.

FIG. 2 illustrates a diagram of an instrument for detecting a level of liquid within a container, according to one embodiment. Instrument 100 is shown including conductive probe 101 that inserts into a container 120 having liquid 121 therein. The conductive probe 101 is shown connected to a liquid tube 109 that enables part or all of the liquid 121 to be drawn from the container 120 via the probe 101. Further, the conductive probe 101 is electrically grounded to a common potential 104 for instrument 100.

The container 120 (e.g., a glass or plastic sample tube or test tube) having liquid 121 within is shown having cap 133 (e.g., a rubber stopper) disposed in the open end of the container 120. The cap 133 includes a hole that enables the probe 101 to enter the container 120. The cap 133 may be made of any variety of materials, such as elastomeric and/or polymeric materials (e.g., plastic).

A cap piercing needle 105 made of a conductive material and is configured to pierce the cap 133—e.g., via the hole disposed in the cap 133. For example, the hole in the cap 133 may be completely or partially closed by the elastomeric material when inserted within the container 120 and before the cap piercing needle 105 is inserted through the hole of the cap 133. In the embodiment shown, the cap piercing needle 105 is electrically grounded to the common potential 104 of instrument 100. It should be appreciated that in other embodiments, the cap piercing needle 105 may be made from any other variety of conductive and/or non-conductive materials, such as plastics or glass.

As stated above, the cap 103 has a hole formed therein that enables the conductive probe 101 to be inserted into the container. When inserted into the hole in the cap 133, the conductive probe 101 is pushed or otherwise displaced through an inner lumen of the cap piercing needle 105 to enter the container 120. The conductive probe 101 is inserted into the container 120 such that the conductive probe 101 eventually contacts the liquid 121 within the container 120.

In the embodiment shown, conductive probe 101 is coupled to a probe arm 106 that is raised and lowered by an arm lifter 107 that is driven by motor 108. The motor is controlled, for example, by a computer (not shown) that is communicatively coupled to the motor 108.

Instrument 100 includes a capacitive sensor 102 having capacitive electrodes 111. The capacitive sensor 102 is disposed next to a container site 103 wherein a holder 110 maintains and stabilizes the container 120 in the upright position. The capacitive sensor 102 is positioned on one side of the container 120 and holder 110 such that capacitive electrodes 111 are disposed near the container.

In the embodiment shown, the capacitive electrodes 111 include a central capacitive electrode and a pair of coupled capacitive electrodes. Each of the pair of coupled capacitive electrodes is smaller than the central capacitive electrode. The plurality of capacitive electrodes 111 are stacked vertically with respect to one another such that one of the coupled capacitive electrodes is above the central capacitive electrode and the other coupled capacitive electrode is below the central capacitive electrode.

In use, a container 120 is positioned at a container site 103 for the hematology instrument 100. The container site 103 may include a holder 114 that maintains the container 120 a proper position during operation. The probe 101 is positioned adjacent the entry end of the container 120 and relatively displaced towards the container 120 such that the probe 101 eventually enters the container 120 and continues until touching liquid 121 that is within the container 120. The probe 101 may be moved, for example, by the arm lifter 107 and motor 108 as described above. The container 120 may also include a cap 133 and cap piercing needle 105 disposed in the open end of the container 120. In such case, the cap piercing needle 105 is inserted through a hole within the cap, and the probe 101 enters the container via the lumen formed by the cap piercing needle 105. As the probe 101 is inserted within the container 120, the calibration module 114 calibrates the capacitive sensor 102 a plurality of times. The calibration accounts for any capacitive changes on the capacitive electrodes 111 due to the displacement of the probe 101. The calibration may occur at various times or points of the displacement of the probe, as mentioned above and described below. When the probe touches the liquid within the container, the capacitance on the capacitive electrodes 111 changes significantly and is detected by the detection module 112 of the capacitive sensor. The detection is output accordingly by the output module 113.

Figure 3:
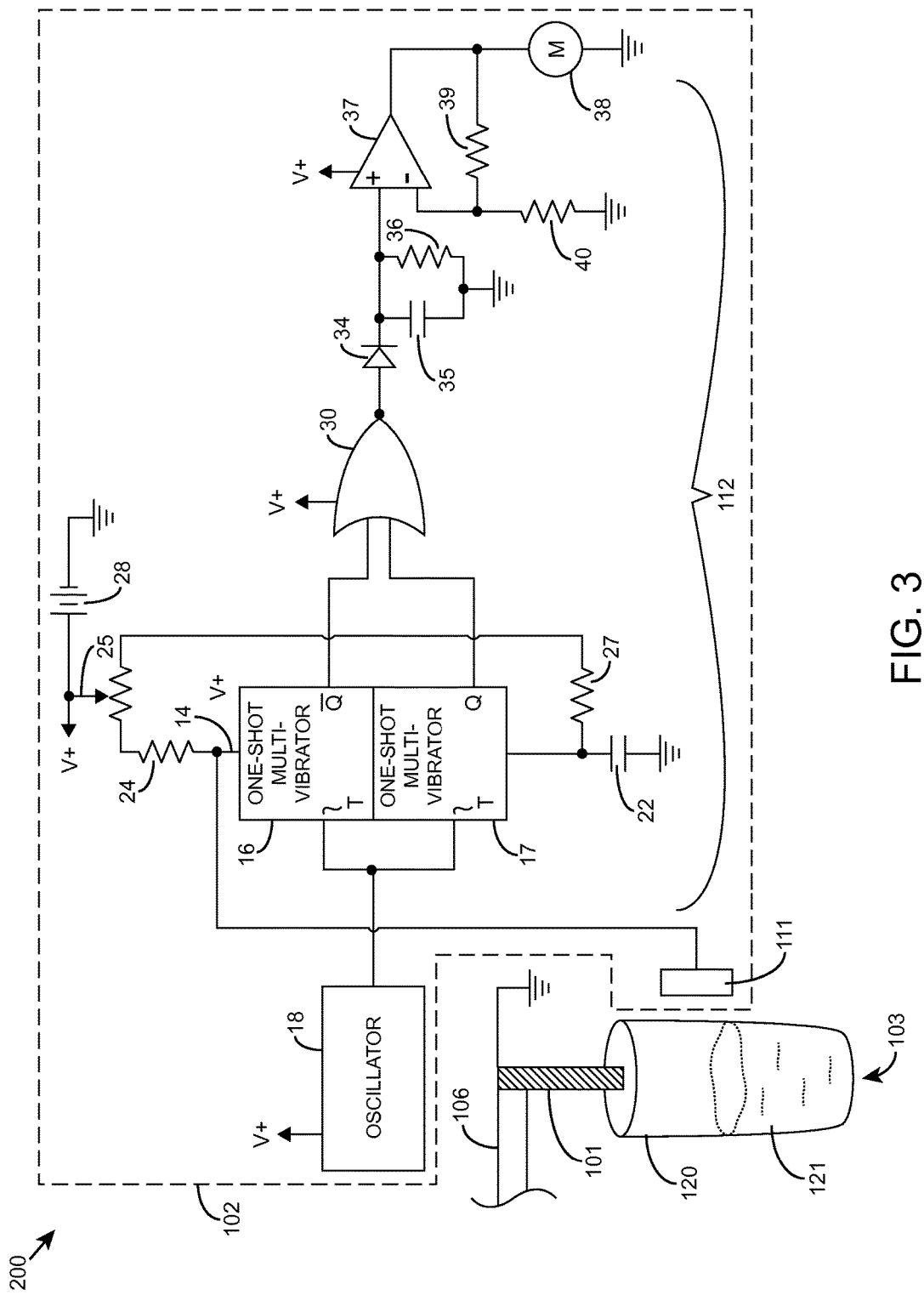
FIG. 3 illustrates a schematic liquid level detection circuit, according to one embodiment.

FIG. 3 illustrates a partial circuit diagram of an instrument for detecting a level of liquid within a container, according to one embodiment. Instrument 200 includes capacitive sensor 102 and probe 101 disposed next to a container 120 maintained at a container site 103. The probe 101 is disposed above the container 120 and is configured to lower within the container 120. The capacitive sensor 102 includes a single capacitive electrode 111 that is positioned next to the side of the container 120. The capacitive electrode is approximately one inch squared in area. As shown in FIG. 3, the circuit includes a capacitive plate 111 which is positioned next to a container 120 maintained at a container site 103 and having liquid 121 therein. A conductive probe 101 is electrically grounded and positioned above the container 120. The probe 101 is coupled to a probe arm 106 that lowers the probe 101 into the container 120.

Capacitive electrode 111 is coupled to detection module 112. In the embodiment shown, capacitive electrode 111 is coupled to one terminal of a first one-shot multivibrator 16. A second one-shot multivibrator 17 is also provided with an oscillator 18 connected to provide a signal for triggering both multivibrators simultaneously at a constant rate. One example type of multivibrator suitable for use in the circuit of FIG. 3 is CMOS MC 14528 manufactured by Motorola, Inc.

At the time the multivibrators are triggered, the input waveforms of the multivibrators drop to their zero levels and thereafter the waveforms rise exponentially in a positive direction towards a threshold level. The rate at which the outputs from the multivibrators rise is determined by the relative sizes of the capacitance of the capacitive electrode 111 positioned close to the container 120 and a fixed capacitor 22 connected to a terminal of the multivibrator 17. The capacitive electrode 111 is connected to the terminal 14 of the multivibrator 16 and forms with the resistor 24 and the potentiometer 25 connected to a source of voltage such as the battery 28, the time constant determining circuit. Similarly the capacitor 22 and the resistor 27 in combination with the potentiometer 25 determine the time constant for the multivibrator 17. Thus it can be seen that the output or time constant of the multivibrator 17 is constant since the capacitor 22 is constant, however, because the capacitance of the capacitive electrode 111 can vary as the probe 101 contacts liquid 121, the time constant for the multivibrator 16 can change. Furthermore, the capacitive electrode 111 can also vary due to the displacement of the probe 101. Calibrating the capacitive sensor as the probe is displaced towards the liquid 121 will nullify any capacitive changes due to the displaced probe.

Thus, there can be caused a time difference between the termination of the output signal of multivibrator 16 and the output signal of the multivibrator 17 as indicated by the time the input waveforms to the multivibrators respectively reach a threshold voltage.

For detection of changes in the time constants of the multivibrator output signals, these output signals are fed to the respective terminals of a NOR gate 30 which, during the time that the outputs from the multivibrators are both below the logic switching level of the NOR gate, i.e. the time difference between the level change of the multivibrator signals, will produce an output pulse. The peak of the output pulse extending above the threshold voltage of the diode 34 is thus supplied for charging a capacitor 35. The capacitor is connected in parallel with a resistor 36 which is of relatively high resistance to allow the charge on the capacitor 35 to dissipate slowly.

An operational amplifier 37 is connected in a noninverting configuration and receives the voltage corresponding to the charge on the capacitor 35 at the positive terminal to supply an amplified voltage output signal to a meter 38. The circuit of the resistors 39 and 40 are provided to energize the other terminal of the operational amplifier and determine the voltage gain of the circuit.

The meter 38 indicates the charge on the capacitor 35 which in turn reflects the difference in the time of reaching the threshold voltage for the output signals of the multivibrators 16 and 17. Since this time period is based upon the relative charges of the capacitors and since the charge on capacitive electrode 111 changes when the probe 101 contacts the liquid 121, the meter indicates when contact has occurred. That is, so long as the probe does not contact the liquid 121 and the capacitive sensor calibrated for displacement of the probe 101, the capacitance of the capacitive electrode 111 remains substantially constant. However with the probe 101 contacting the liquid 121, the capacitive value of the capacitive electrode 111 changes thereby changing the time constant of the multivibrator 16 resulting in a higher reading on the meter 38 because of the growing difference between the termination of the output signals of the multivibrators 16 and 17.

A calibration module 114 includes circuitry to calibrate the capacitive sensor 102. For example, the potentiometer 25 is adjusted so that the output of the NOR gate is very slightly positive, that is, so that there is a very slight indication of the transmission of the output above the conduction level of the diode 34 as shown by a low meter reading on the meter 38. Thereafter contact between the probe 101 and liquid 121 will cause the value of the capacitance on the capacitive electrode 111 to change resulting in a difference in conduction time between the multivibrators as indicated by the meter 38.

Figure 4:
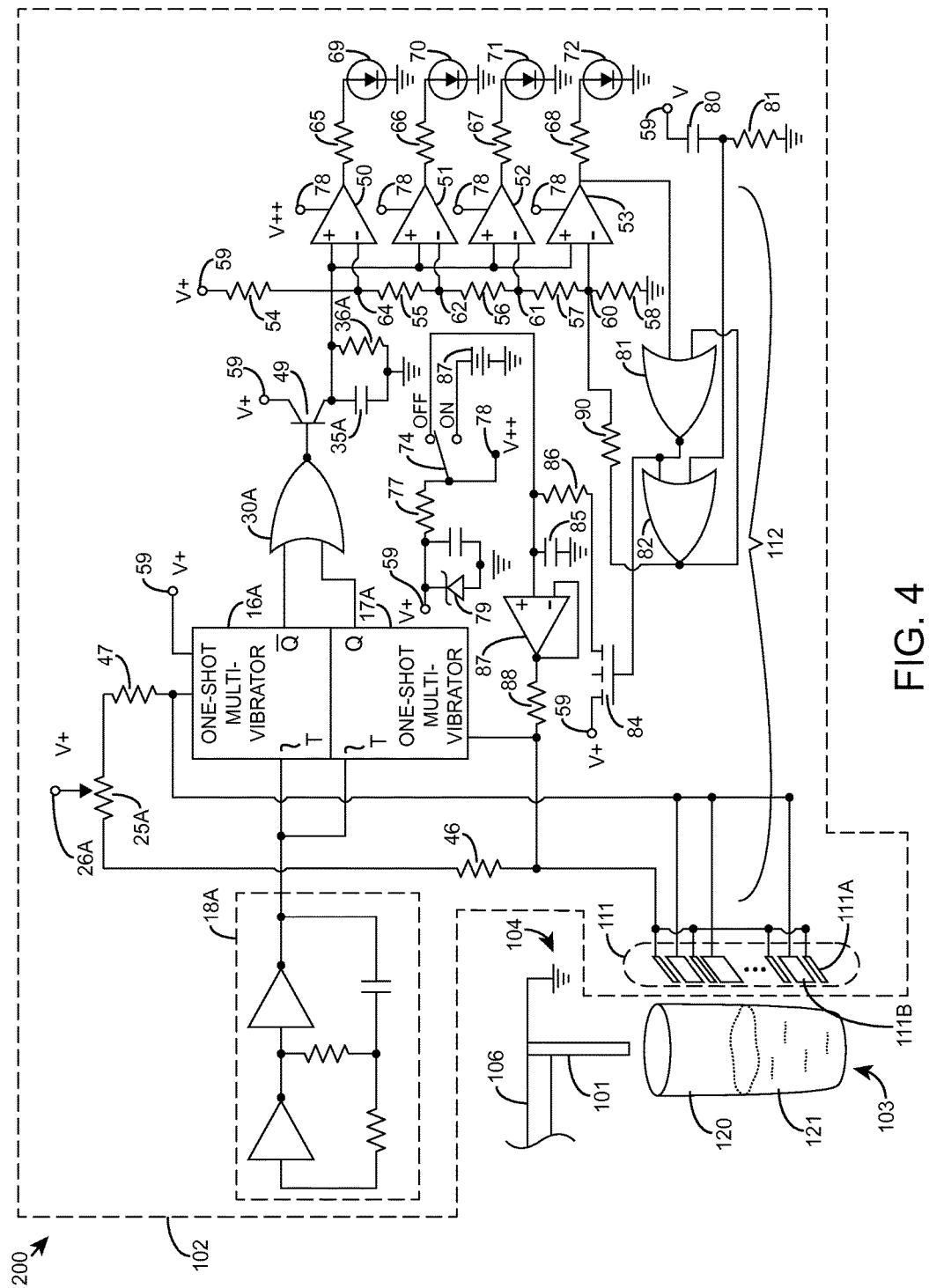
FIG. 4 illustrates a schematic liquid level detection circuit, according to one embodiment.

FIG. 4 illustrates a partial circuit diagram of an instrument for detecting a level of liquid within a container, according to one embodiment. Instrument 200 includes probe 101 and capacitive sensor 102 having a plurality of capacitive electrodes 111 disposed next to a container 120 maintained at a container site 103. The probe 101 is disposed above the container 120 and is configured to lower within the container 120. The plurality of electrodes 111 includes a first plurality of capacitive electrodes 111a and second plurality of capacitive electrodes 111b. The first plurality 111a includes N capacitive electrodes (e.g., 10 capacitive electrodes) electrically coupled to each other. Similarly, the second plurality 111b includes N capacitive electrodes (e.g., 10 capacitive electrodes) electrically coupled to each other. Each of the first plurality 111a of coupled capacitive electrodes is shaped as thin strips approximately 1 inch by 0.1 inch. Each of the second plurality 111b of coupled capacitive electrodes is larger than the electrodes in the first plurality 111a, and is approximately 1 inch by 1 inch.

The plurality of capacitive electrodes is coupled to detection module 112. Detection module 112 includes a pair of one-shot multivibrators 16A and 17A are provided which function in the same manner described in the embodiment in FIG. 3. An oscillator 18A is provided for triggering these multivibrators and a potentiometer 25A connected to a voltage source V+ at terminal 26A is utilized to power the circuit.

As in the previous embodiment in FIG. 3, operation of this circuit also detects the change in capacitance of the capacitive electrodes 111 as the probe 101 contacts the liquid 121. However in the embodiment shown in FIG. 4, there is a plurality of capacitive electrodes 111, which improve the response to the change in capacitance from the probe. Accordingly the capacitive electrodes 111b are alternately positioned between a plurality of coupled capacitive electrodes 111a. The capacitive electrodes 111a are smaller than the capacitive electrodes 111b in total area. In the circuit the time duration of the input of the multivibrator 16A is dependent upon the capacitance of the capacitive electrodes 111b, the resistance 47 and the setting of the potentiometer 25A. Similarly the time duration of the input of the multivibrator 17A is dependent upon the capacitance of the capacitive electrodes 111a, the value of the resistor 46 and the setting of the potentiometer 25A.

As the probe 101 is moved towards the liquid, the output signal of the multivibrators 16A and 17A will change based on capacitive changes received by the adjacent capacitive electrodes. The capacitive sensor 102 may be calibrated as the probe is displaced to nullify any effects on capacitance of the capacitive electrodes. When the probe 101 contacts liquid 121 within container 120, the capacitance on the capacitive electrodes is changed significantly. By use of the multiple capacitor plates in the two multivibrator circuits, a more distinct or sharp waveform is obtained for detecting the difference in the capacitance of the multivibrator circuits caused by the probe 101 contacting the liquid 121 in the container 120.

Figure 5C:
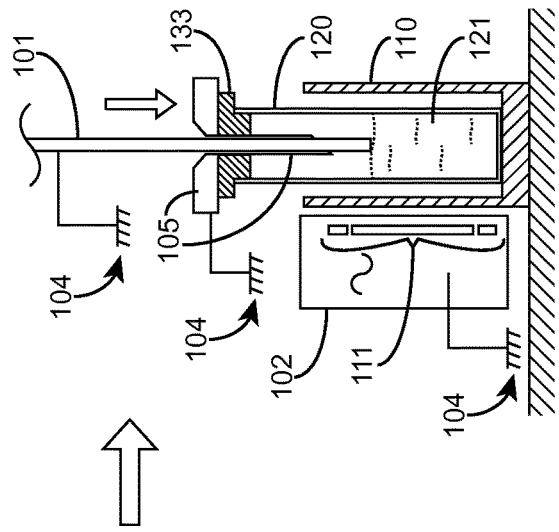
FIGS. 5A-5C illustrates a hematology instrument with liquid level detection at different times during liquid level detection, according to one embodiment.
Figure 5B:
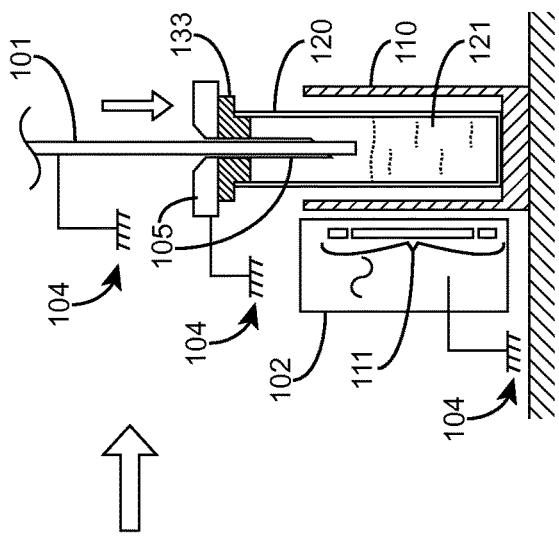
Figure 5A:
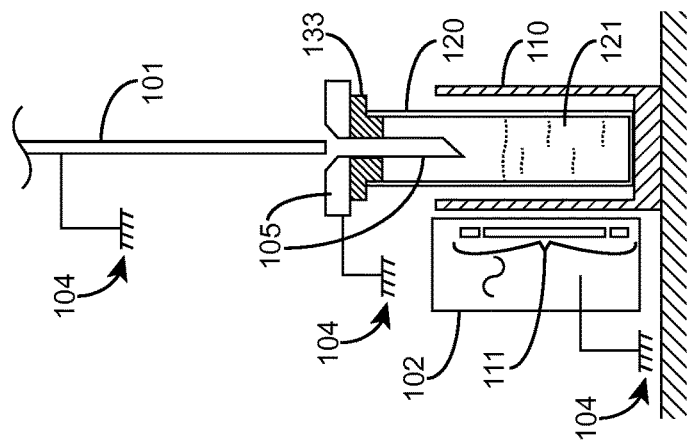

FIGS. 5A-5C illustrate the hematology instrument shown in FIG. 1 during different times in operation, according to one embodiment. The container 120 contains liquid 121 and is capped with a cap 133 (e.g., rubber stopper). A cap piercing needle 105 is inserted within a hole in the cap 133. The cap piercing needle 105 is electrically grounded. The container 120 is disposed in holder 110 and maintained in an upright position. The capacitive sensor 102 is disposed to one side of the container 120 and holder 114. The capacitance of the capacitive electrodes 111 are influenced by the objects next to it—e.g., the container and liquid therein.

In FIG. 5A, a conductive probe 101 is electrically grounded and lowered toward the container 120 (e.g., by arm lifter 107 and motor 108). The capacitive sensor 102 is calibrated by the calibration module 114 before or as the conductive probe 101 is about to enter the cap piercing needle 105. In FIG. 5B, the conductive probe 101 is inserted within the cap piercing needle 105. The capacitive sensor 102 is then calibrated again by the calibration module 114 to cancel the conductive probe's influence on the capacitance on the capacitive electrodes 111.

When the conductive probe 101 reaches the surface of the liquid within the sample, as shown in FIG. 5C, a large change in capacitive load on the capacitive electrodes 111 is detected by the detection module 112 in the capacitive sensor 102. The large change in capacitance occurs when the grounded probe 101 contacts the liquid 121. The detection module 112 detects the capacitive change on the electrodes 111 and outputs an indication of the detection via output module 113. For example, the output module 113 may transmit data representing the liquid level detection to a computer, which may store and process the data related to the liquid level. The computer may then stop the displacement of the probe, for example, to prevent the probe from going further into the liquid 121.

It should be appreciated that in other embodiments, the capacitive sensor 102 may be calibrated a different number of times than shown in FIGS. 5A-5C. For example, if the liquid level is low, the capacitive sensor 102 may be calibrated a plurality of times as the conductive probe 101 is extending through the cap piercing needle towards the surface of the liquid. For instance, the conductive probe 101 may be incrementally lowered in small distances, with the capacitive sensor 102 being calibrated at each increment. In this way, small changes in capacitive loads from the conductive probe 101 are ignored as the conductive probe 101 is extended through the cap piercing needle 105 and container 120 towards the liquid 121.

FIGS. 6A-6D illustrate the hematology instrument shown in FIG. 1 with a low level of liquid in the sample tube, according to one embodiment. Instrument 100 is similarly configured as the instrument 100 shown in FIGS. 5A-5C, except the liquid level in the container 120 in FIGS. 6A-6D is low. For example, the liquid level may be less than 3 mL, such as 1 mL or less.

In FIG. 6A, the conductive probe 101 is lowered toward the container 120 by the arm lifter 107 and motor 108, and the capacitive sensor 102 is calibrated by the calibration module 114 before or as the conductive probe 101 is about to enter the cap piercing needle 105, similarly as shown in FIG. 5A.

In FIG. 6B, the conductive probe 101 is inserted within the cap piercing needle 105, and the capacitive sensor 102 is calibrated again by the calibration module 114 to cancel the conductive probe's influence on the capacitance on the capacitive electrodes 111, similarly as shown in FIG. 5B.

In FIG. 6C, the conductive probe 101 is extended an additional distance from the last calibration in FIG. 6B and again calibrated by the calibration module 114. In this way, any additional change in capacitance on the capacitive electrodes 111 due to the movement of the conductive probe 101 will be ignored.

In FIG. 6D, the conductive probe 101 reaches the surface of the liquid 121 within the container 120 and a large change in capacitance on the capacitive electrodes 111 is detected by the detection module 112 of the capacitive sensor 102. The detection module 112 detects the capacitive change on the electrodes 111 and outputs an indication of the detection via output module 113.

It should be appreciated that the capacitive sensor 102 may be calibrated any number of times by the calibration module 114 as it is moved toward the surface of the liquid 121. In one embodiment, for example, the conductive probe 101 may be incrementally lowered a predetermined distance with the capacitive sensor 102 being calibrated at each increment by the calibration module 114 until the conductive probe 101 reaches the liquid 121 in the container 120.

FIGS. 7A-7B illustrate the hematology instrument shown in FIG. 1 wherein liquid is contained within a pediatric sample tube. The pediatric sample tube 120 includes a small volume of liquid 121 (e.g., 125 microliters).

In FIG. 7A, instrument 100 is similarly configured as the instrument 100 shown in FIGS. 5A-5C, except the liquid 121 in the pediatric sample tube 120 is positioned in the pediatric sample tube 120 closer to the cap 133. In FIG. 7A, the capacitive sensor 102 is calibrated by the calibration module 114 before or as the conductive probe 101 is about to enter the cap piercing needle 105, similarly as shown in FIG. 5A.

In FIG. 7B, the conductive probe 101 is inserted within the cap piercing needle 105, and the conductive probe 101 comes in contact with the fluid 121 in the pediatric sample tube 120 and a large change in capacitance on the capacitive electrodes 111 is detected by the detection module 112 of the capacitive sensor 102. The detection module 112 detects the capacitive change on the electrodes 111 and outputs an indication of the detection via output module 113.

The following paragraphs provide additional example embodiments for methods related to the detection of liquid levels in a container for a hematology instrument.

In some aspects of the present disclosure, a method of detecting a liquid level in a container for a hematology instrument is provided. The method includes providing a liquid level detection unit having a capacitive sensor with at least one capacitive electrode and a detection module to detect capacitive changes at the at least one capacitive electrode; and a probe disposed next to the container site. The probe is electrically grounded and is displaceable relative to the container site to enter a container when positioned at the container site. The method also includes positioning the at least one capacitive electrode next to the container site, configuring a calibration module to calibrate the capacitive sensor a plurality of times as the probe displaces relative to the container site, and configuring the detection module to detect a capacitive change at the at least one capacitive electrode when the probe contacts liquid in the container.

In one embodiment, the positioning of the at least one capacitive electrode includes positioning a plurality of capacitive electrodes one after another in the direction of the displacement of the probe.

In one embodiment, the positioning of the at least one capacitive electrode includes positioning a central capacitive electrode between a pair of coupled capacitive electrodes. Each of the pair of coupled capacitive electrodes is smaller in physical size than the central capacitive electrode.

In one embodiment, the positioning of the at least one capacitive electrode includes positioning a first plurality of coupled capacitive electrodes to alternate between a second plurality of coupled capacitive electrodes. In some instances, each of the coupled capacitive electrodes of the first plurality is smaller in size than each of the coupled capacitive electrodes of the second plurality. In some instances, the first plurality and the second plurality of coupled capacitive electrodes include seven to twelve capacitive electrodes each.

In one embodiment, the calibration module is configured to calibrate the capacitive sensor before the probe is displaced relative to the container site. In one embodiment, the calibration module is configured to calibrate the capacitive sensor after the probe is displaced relative to the container site. In some instances, the calibration module is configured to calibrate the capacitive sensor after the probe displaces a predetermined distance relative to the container site. In one embodiment, the calibration module is configured to calibrate the capacitive sensor after predetermined incremental distances relative to the container site.

In one embodiment, the method includes positioning a container at the container site. In some instances, the calibration module is configured to calibrate the capacitive sensor before the probe enters the container. In some instances, the calibration module is configured to calibrate the capacitive sensor after the probe enters the container. In some instances, the calibration module is configured to calibrate the capacitive sensor after the probe displaces a predetermined distance within the container. In some instances, the calibration module is configured to calibrate the capacitive sensor after predetermined incremental distances within the container.

In one embodiment, the method includes positioning a cap on the container, positioning a cap piercing needle within the cap, and relatively displacing the probe through the cap piercing needle to enter the container.

In some aspects of the present disclosure, a method of detecting a liquid level in a container for a hematology instrument is provided. The method includes positioning at least one capacitive electrode of a capacitive sensor 102 next to a container including liquid, and positioning a probe adjacent to an entry point of the container. The probe is electrically grounded. The method also includes displacing the probe relative to the container to enter the container and contact the liquid, calibrating the capacitive sensor 102 a plurality of times as the probe is displaced relative to the container, and detecting a capacitive change at the capacitive electrodes when the probe contacts the liquid.

In one embodiment, the positioning of the at least one capacitive electrode includes positioning a plurality of capacitive electrodes one after another in the direction of the displacement of the probe.

In one embodiment, the positioning of the at least one capacitive electrode includes positioning a central capacitive electrode between a pair of coupled capacitive electrodes, wherein each of the pair of coupled capacitive electrodes is smaller in physical size than the central capacitive electrode.

In one embodiment, the positioning of the at least one capacitive electrode includes positioning a first plurality of coupled capacitive electrodes to alternate between a second plurality of coupled capacitive electrodes. In some instances, each of the coupled capacitive electrodes of the first plurality is smaller in size than each of the coupled capacitive electrodes of the second plurality. In some instances, the first plurality and the second plurality of coupled capacitive electrodes include seven to twelve capacitive electrodes each.

In one embodiment, the capacitive sensor is calibrated before the probe is displaced relative to the container site. In one embodiment, the capacitive sensor is calibrated after the probe is displaced relative to the container site. In some instances, the capacitive sensor is calibrated after the probe displaces a predetermined distance relative to the container site. In some instances, the capacitive sensor is calibrated after predetermined incremental distances relative to the container site.

In one embodiment, the method includes positioning a container at the container site. In some instances, the capacitive sensor is calibrated before the probe enters the container. In some instances, the capacitive sensor is calibrated after the probe enters the container. In some instances, the capacitive sensor is calibrated after the probe displaces a predetermined distance within the container. In some instances, the capacitive sensor is calibrated after predetermined incremental distances within the container.

In one embodiment, the method includes positioning a cap on the container, positioning a cap piercing needle within the cap, and relatively displacing the probe through the cap piercing needle to enter the container.

In some aspects of the present disclosure, kits including one or more hematology instruments with liquid level detection for liquid in a container are provided. In one embodiment, the kit includes manuals or marketing products related to the hematology instrument. In one embodiment, the kit includes a hematology instrument and one or more containers, such as test tubes or sample tubes. In one embodiment, the kits include software related to the hematology instrument. For example, the software may be used to program and otherwise operate the hematology instrument. For example, the software may be loaded on a computer to operate with the hematology instrument.

Other embodiments and modifications within the scope of the present disclosure will be apparent to those skilled in the relevant art. Various modifications, processes, as well as numerous structures to which the embodiments of the present disclosure may be applicable will be readily apparent to those of skill in the art to which the present disclosure is directed upon review of the specification. Various aspects and features of the present disclosure may have been explained or described in relation to understandings, beliefs, theories, underlying assumptions, and/or working or prophetic examples, although it will be understood that the present disclosure is not bound to any particular understanding, belief, theory, underlying assumption, and/or working or prophetic example.

It should be understood that some of the techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICS), programmable logic devices (PLDs), field-programmable gate arrays (FPGAs), etc.

Software or firmware implementing the techniques introduced herein may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing took, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The preceding examples are put forth so as to provide those of ordinary skill in the art with a complete disclosure and description of how to make and use the embodiments of the invention, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

That which is claimed is:

1. A hematology instrument with liquid level detection for liquid in a container, comprising:
   a probe disposed at a position relative to a container site, wherein the probe is displaceable relative to the container site upon entering into a container positioned at the container site, and wherein the probe is electrically grounded;
   a capacitive sensor comprising:
      at least one capacitive electrode disposed next to the container site, wherein the at least one capacitive electrode comprises:

a first plurality of coupled capacitive electrodes; and a second plurality of coupled capacitive electrodes alternately disposed between the first plurality of coupled capacitive electrodes in the direction of the displacement of the probe, wherein each of the first plurality of coupled capacitive electrodes is smaller in physical size than each of the second plurality of coupled capacitive electrodes; and a detection module to detect capacitive changes at the at least one capacitive electrode when the probe contacts liquid in the container; and a calibration module that calibrates the capacitive sensor a plurality of times as the probe displaces relative to the container site to enter the container.

2. The hematology instrument of claim 1, wherein the first plurality and the second plurality of coupled capacitive electrodes include seven to twelve capacitive electrodes each.

3. The hematology instrument of claim 1, wherein the calibration module calibrates the capacitive sensor before the probe is displaced relative to the container site.

4. The hematology instrument of claim 1, wherein the calibration module calibrates the capacitive sensor after the probe is displaced relative to the container site.

5. The hematology instrument of claim 1, wherein the calibration module calibrates the capacitive sensor after the probe displaces a predetermined distance relative to the container site.

6. The hematology instrument of claim 1, wherein the calibration module calibrates the capacitive sensor after displacement of the probe by predetermined incremental distances relative to the container site.

7. The hematology instrument of claim 1, wherein the calibration module calibrates the capacitive sensor before the probe enters the container.

8. The hematology instrument of claim 1, wherein the calibration module calibrates the capacitive sensor after the probe enters the container.

9. The hematology instrument of claim 1, wherein the calibration module calibrates the capacitive sensor after the probe displaces a predetermined distance within the container.

10. The hematology instrument of claim 1, wherein the calibration module calibrates the capacitive sensor after predetermined incremental distances within the container.

11. The hematology instrument of claim 1, further comprising:

a cap disposed on the container; and a cap-piercing needle disposed within the cap, wherein the probe is relatively displaced through the cap-piercing needle to enter the container.

12. The hematology instrument of claim 1, wherein calibration of the capacitive sensor is based upon detected changes in the capacitance of the at least one capacitive electrode as the probe is displaced relative to the container site.

13. A method of detecting a liquid level in a container for a hematology instrument, comprising:

providing a liquid level detection unit including:

a capacitive sensor with at least one capacitive electrode and a detection module to detect capacitive changes at the at least one capacitive electrode; and a probe disposed at a position relative to a container site, wherein the probe is electrically grounded, and wherein the probe is displaceable relative to the container site upon entering into a container;

positioning the at least one capacitive electrode next to the container site, wherein the at least one capacitive electrode comprises:

a first plurality of coupled capacitive electrodes; and a second plurality of coupled capacitive electrodes alternately disposed between the first plurality of coupled capacitive electrodes in the direction of the displacement of the probe, wherein each of the first plurality of coupled capacitive electrodes is smaller in physical size than each of the second plurality of coupled capacitive electrodes, configuring a calibration module to calibrate the capacitive sensor a plurality of times as the probe displaces relative to the container site to enter the container; and configuring the detection module to detect a capacitive change at the at least one capacitive electrode when the probe contacts liquid in the container.

14. The method of claim 13, wherein the first plurality and the second plurality of coupled capacitive electrodes include seven to twelve capacitive electrodes each.

15. The method of claim 13, wherein the calibration module calibrates the capacitive sensor before the probe is displaced relative to the container site.

16. The method of claim 13, wherein the calibration module calibrates the capacitive sensor after the probe is displaced relative to the container site.

17. The method of claim 13, wherein the calibration module calibrates the capacitive sensor after the probe displaces a predetermined distance relative to the container site.

18. The method of claim 13, wherein the calibration module calibrates the capacitive sensor after predetermined incremental distances relative to the container site.

19. The method of claim 13, further comprising positioning a container at the container site, wherein the calibration module calibrates the capacitive sensor before the probe enters the container.

20. The method of claim 13, further comprising positioning a container at the container site, wherein the calibration module calibrates the capacitive sensor after the probe enters the container.

21. The method of claim 13, further comprising positioning a container at the container site, wherein the calibration module calibrates the capacitive sensor after the probe displaces a predetermined distance within the container.

22. The method of claim 13, further comprising positioning a container at the container site, wherein the calibration module calibrates the capacitive sensor after predetermined incremental distances within the container.

23. The method of claim 13, further comprising:

positioning a cap on the container;

positioning a cap-piercing needle within the cap; and relatively displacing the probe through the cap-piercing needle to enter the container.

24. The method of claim 13, wherein calibration of the capacitive sensor is based upon detected changes in the capacitance of the at least one capacitive electrode as the probe is displaced relative to the container site.

* * * * *